(12) United States Patent
Shioya et al.

(10) Patent No.: US 6,597,409 B1
(45) Date of Patent: Jul. 22, 2003

(54) VIDEO PROJECTOR

(75) Inventors: Yukinori Shioya, Tokyo (JP); Masao Imai, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 09/494,509

(22) Filed: Jan. 31, 2000

(30) Foreign Application Priority Data

Jan. 29, 1999 (JP) ............................................ 11-020960
Mar. 17, 1999 (JP) ............................................ 11-071288

(51) Int. Cl.$^7$ ................................................ H04N 9/12
(52) U.S. Cl. ...................................... 348/743; 348/742
(58) Field of Search ................................ 348/742, 745, 348/750, 751, 756, 757, 759, 760; 353/30–34; H04N 9/12

(56) References Cited

U.S. PATENT DOCUMENTS

| 2,834,254 A | * | 5/1958 | Sage | ........................... 348/742 |
| 5,371,543 A | * | 12/1994 | Anderson | ..................... 348/270 |
| 5,833,338 A | * | 11/1998 | Barak | ............................. 349/9 |

FOREIGN PATENT DOCUMENTS

| JP | A 62-185456 | 8/1987 |
| JP | 63-316590 | 12/1988 |
| JP | A 5-119753 | 5/1993 |
| JP | A 5-181135 | 7/1993 |
| JP | A 6-265894 | 9/1994 |
| JP | A 7-168181 | 7/1995 |
| JP | A 8-140106 | 5/1996 |
| JP | A 9-304734 | 11/1997 |
| JP | A 10-153755 | 6/1998 |
| JP | A 10-170869 | 6/1998 |
| JP | A 11-2780 | 1/1999 |
| JP | A 11-184398 | 7/1999 |
| JP | A 11-264953 | 9/1999 |

* cited by examiner

Primary Examiner—Michael H. Lee
(74) Attorney, Agent, or Firm—Young & Thompson

(57) ABSTRACT

A video projector which can obtain high brightness of a projected image, high color purity and low color shading and which can be downsized and reduce the manufacturing cost is provided. The video projector has: an optical source 1; a color selection scanning device 21 for selectively filter a color of a light from the optical source 1 to generate a light flux having a specific color in synchronism with a supplied video signal; a video displaying device 4 for modulating an intensity of the light flux in synchronism with the video signal pixel by pixel to form a modulated image responsive to the video image; an imaging lens 72 disposed between the color selection scanning device 21 and the video displaying device 4, for imaging an intensity distribution and a color distribution of the light flux outgoing from the color selection scanning device 21 on a surface of the video displaying device 4; and a projecting lens 5 for projecting the modulated image formed by the video displaying device 4.

21 Claims, 22 Drawing Sheets

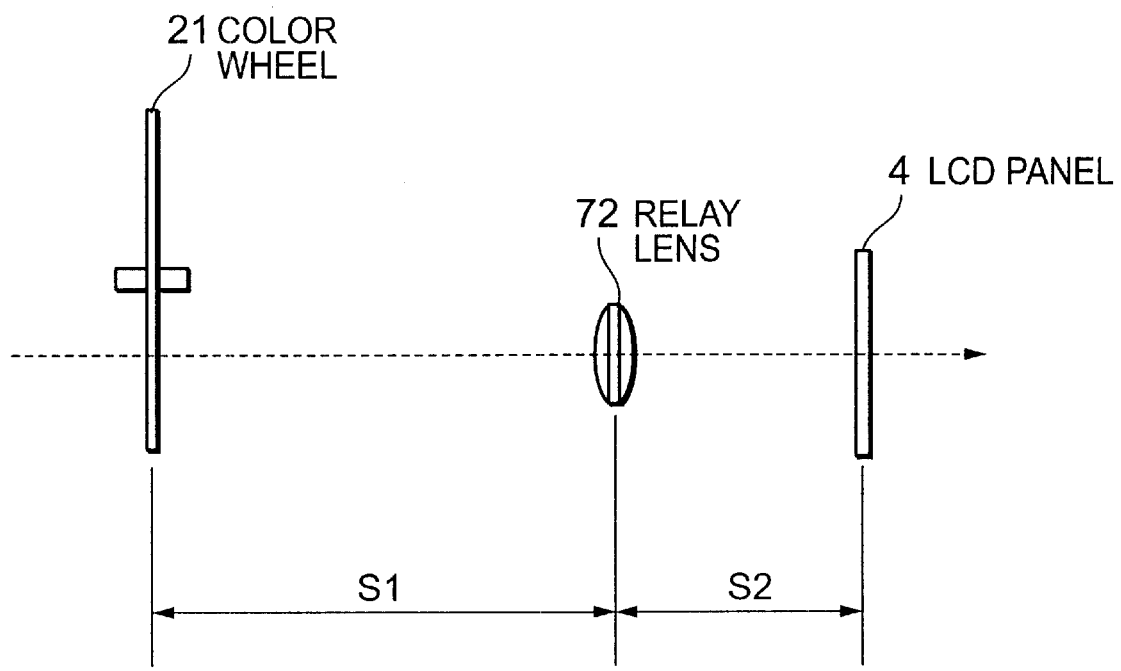

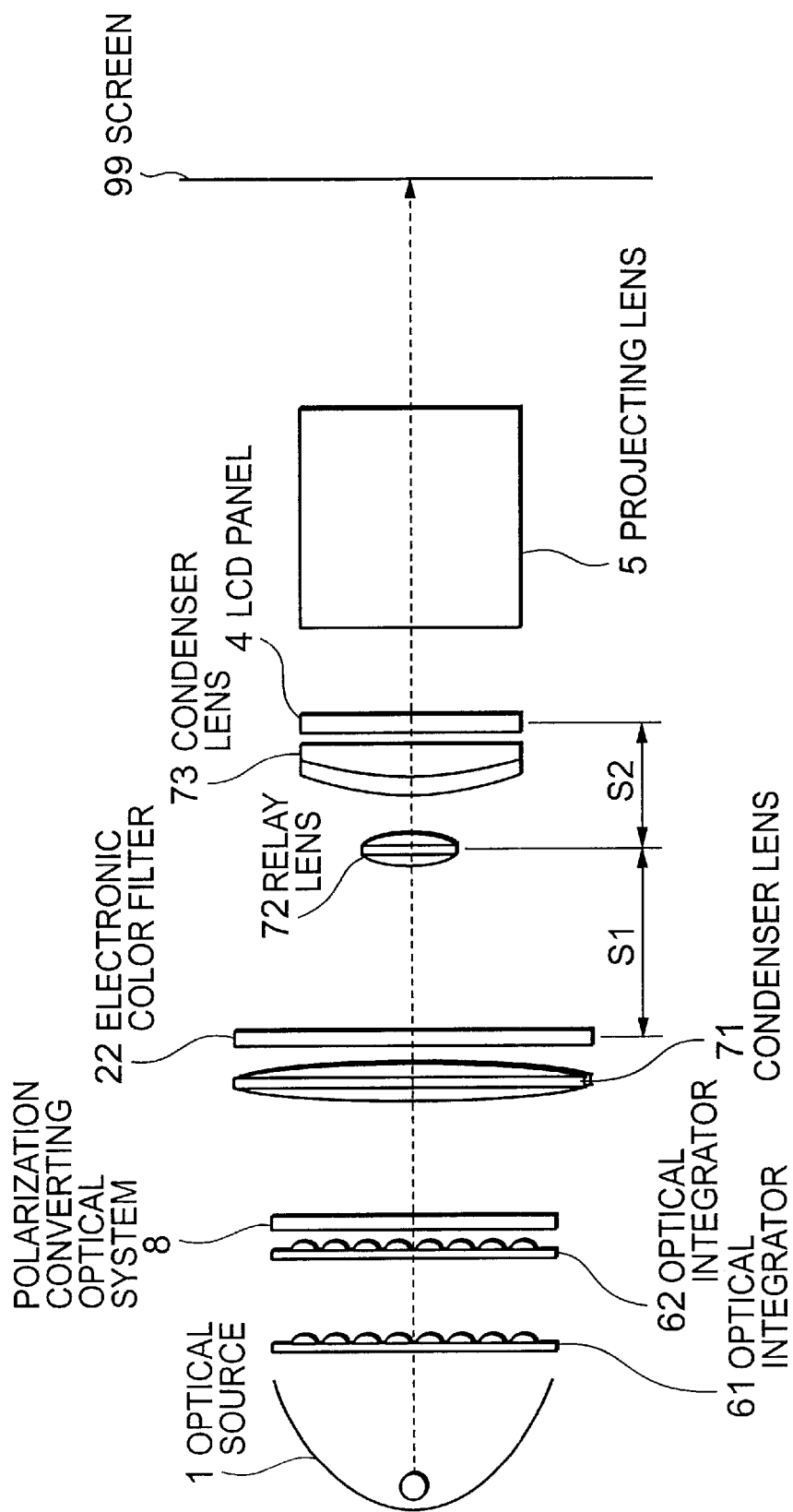

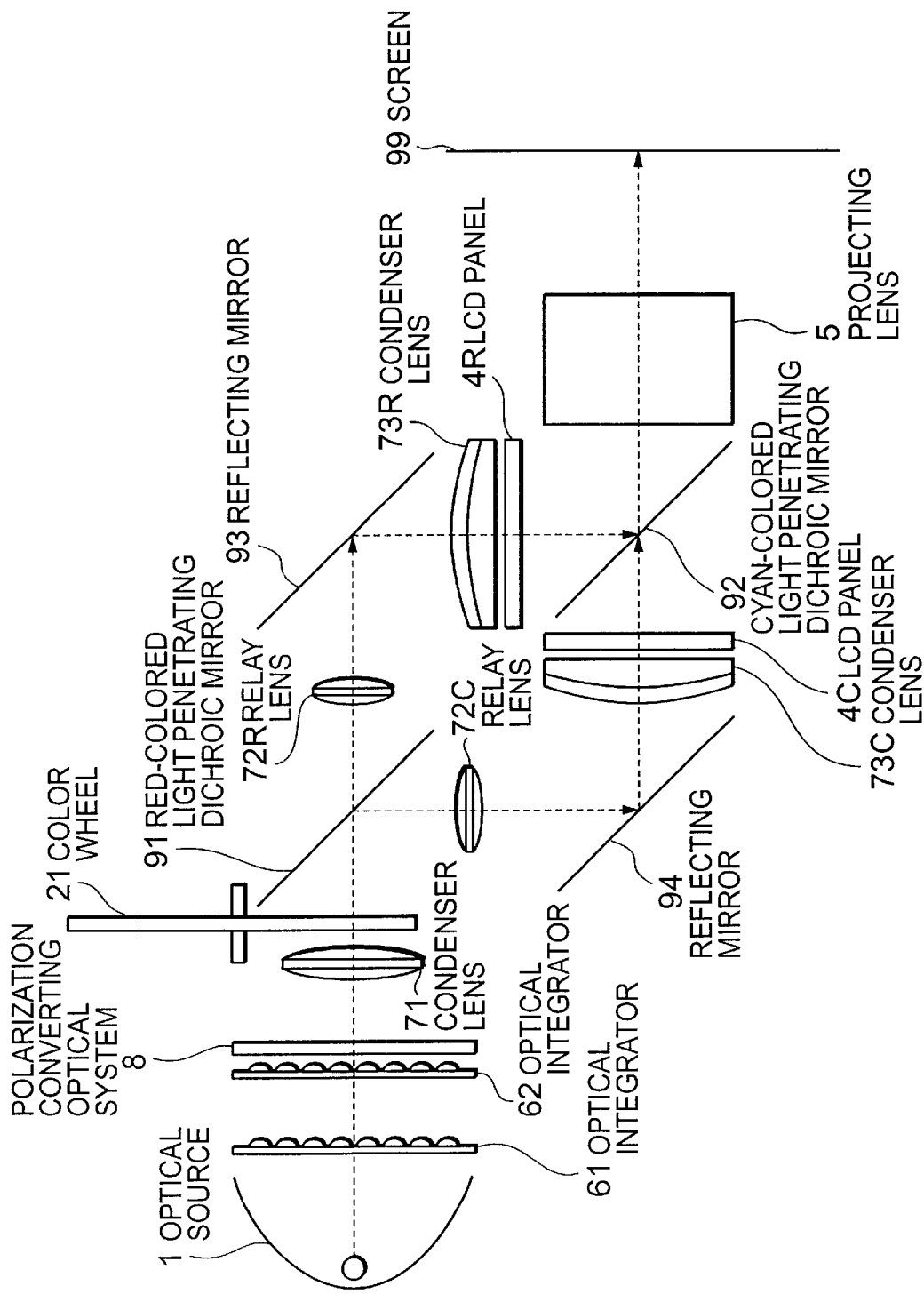

VIDEO PROJECTOR

BACKGROUND OF THE INVENTION

1. Field of the Invention

The present invention relates to a video projector, and more particularly to a video projector for time-dividing a light from a white-light source to light fluxes having given colors to be displayed.

2. Description of the Prior Art

As a video projector for displaying a colored image, there has been a video projector which time-divides a light from a white-light source into three primary-colored light fluxes, thereafter modulates intensities of the three primary-colored light fluxes subjected to time division and combines them for display.

Japanese patent laid-open publication No. Sho 63-316590 (disclosed on Dec. 23, 1988 in Japan) discloses a color selection scanning device for time-dividing a light from a white-light source into three primary-colored light fluxes. There is disclosed a video projector using a color wheel in which three colored translucent filters for transmitting each colored light flux, i.e., a red-colored light flux, a green-colored light flux and a blue-colored light flux therethrough are radialized in a circle, and the technique shown in this publication will be described as a prior art.

FIG. 16 is a perspective view showing the structure of a conventional video projector.

A light from an optical source 101 enters a filter plate 102 so that a red-colored light flux, a green-colored light flux and a blue-colored light fluxesequentially penetrate in synchronism with a rotation of the filter plate 102. Each colored light flux that has penetrated the filter plate 102 enters a flat display 103.

The flat display 103 displays images associated with a red-colored light video signal, a green-colored light video signal and a blue-colored light video signal in synchronism with switching between the red color, the green color and the blue color of the filter plate 102 and modulates intensities of the incident light fluxes for each pixel. The penetrated light fluxes from the flat display 103 are magnified and projected on a screen 105 through a lens system 104.

In the above structure, a velocity and a phase of rotation of the filter plate 102 are controlled in such a manner that colors of the incident light fluxes sequentially changes from the upper side of the filter plate 102 downwards in synchronism with that the image on the flat display 103 are sequentially scanned from the lower side every one line upwards in the horizontal direction.

As described above, in the conventional video projector, a color-projected image is obtained by using the filter plate in which the three elementary colors are radialized as the color selection scanning device.

However, the prior art has the following problems.

Firstly, there is such a problem as that the color purity of an image projected on the screen 105 is low. That is because the optical source 101 is not an ideal point optical source that is infinitely small in size and has a finite largeness expanding to a predetermined range. Light fluxes radiated from the optical source 101 thus contain various angle components, and complete parallel light beams can not be obtained. In this conventional apparatus, since the filter plate 102 and the flat display 103 are provided with a predetermined distance therebetween, a color border formed by the filter plate 102 spreads on a surface of the flat display 103 and adjacent colored lights on the filter plate 102 are mixed.

Secondly, there is a problem of generation of color shading in a projected image. This problem occurs because the flat display 103 is sequentially linearly scanned upwards every one line in the horizontal direction whereas the filter plate 102 is scanned so as to rotate around the rotational axis. FIG. 17 is a partially-enlarged front view showing the filter plate 102 in the video projector illustrated in FIG. 16. Although a color border 102B of the filter plate 102 is horizontal on a horizontal line H running through the rotational axis of the filter plate 102, the inclination of the color border 102B of the filter plate 102 with respect to the horizontal line H becomes large as the color border 102B is separated from the horizontal line H, and a color-mixed area R in which a color of the penetrated light from the filter plate 102 does not coincide with a color modulated by the flat display 103, generating mixture with other colors in the color-mixed area R.

Thirdly, an attempt to suppress color shading in the projected image leads to an increase in size of the apparatus. As apparent from FIG. 17, this problem is generated because a size of the color-mixed area R must be decreased in order to reduce the color shading, and hence a diameter of the filter plate 102 must be set large as possible with respect to the size of the flat display 103 in such a manner that the color border of the filter plate 102 does not largely incline toward the horizontal line H.

Fourthly, reduction in color shading of the projected image involves decrease in brightness of the projected image. That is because provision of a light blocking portion 102X in a predetermined angle range in the radial direction around the color border 102B of the filter plate 102 for the purpose of avoidance of penetration of the light in the color-mixed area R causes the light blocked by the light blocking portion 102X to be disused, thereby reducing the efficiency of the light availability.

SUMMARY OF THE INVENTION

An object of the present invention is to provide a video projector which can obtain high brightness of a projected image, high color purity and low color shading and which can be downsized and reduce the manufacturing cost.

To realize the above-mentioned object, the first aspect of the present invention is that a video projector having: an optical source, a color selection scanning device for selectively filtering a color of a light from the optical source to generate a light flux having a specific color in synchronism with a supplied video signal; a video displaying device for modulating an intensity of the light flux in synchronism with the video signal pixel by pixel to form a modulated image responsive to the video signal; an imaging lens disposed between the color selection scanning device and the video displaying device, for imaging an intensity distribution and a color distribution of the light flux outgoing from the color selection scanning device on a surface of the video displaying device; and a projecting lens for projecting the modulated image formed by the video displaying device.

According to the second aspect of the present invention is that a video projector having: an optical source; a color selection scanning device for selectively filtering a color of a light from the optical source to generate a specific color in synchronism with a supplied video signal; a color separating device for separating a light flux transmitted through or reflected on the color selection scanning device into first and second light fluxes having different wavelengths; a color combining device for combining the first and second light fluxes separated by the color separating device; a first video displaying device disposed between the color separating device and the color combining device, for modulating an intensity of the first light flux in synchronism with the video signal pixel by pixel to form a first modulated image responsive to the video signal; a second video displaying device disposed between the color separating device and the color combining device, for modulating an intensity of the second light flux in synchronism with the video signal pixel by pixel to form a second modulated image responsive to the video signal; a first imaging lens disposed between the color separating device and the first video displaying device, for imaging an intensity distribution and a color distribution of the light flux outgoing from the color selection scanning device on a surface of the first video displaying device; a second imaging lens disposed between the color separating device and the second video displaying device, for imaging an intensity distribution and a color distribution of the light flux outgoing from the color selection scanning device on a surface of the second video displaying device; and a projecting lens for projecting the first modulated image and the second modulated image formed by the first video displaying device and the second video displaying device.

In the present invention, since the imaging lens, i.e., a relay lens is provided between the color selection scanning device and the video displaying device, each colored light fluxesubjected to time division manner by the color selection scanning device can be precisely imaged on a surface portion of the video displaying device, thereby improving the color purity of the projected image without generating color mixture on the surface of the video displaying device.

Further, the size of a virtual image of the video display device on the surface of the color section scanning device can be arbitrarily set by appropriately selecting each distance between the color selection scanning device, the imaging lens and the video displaying device and a focal distance of the imaging lens and changing a magnification of the imaging lens. For example, when using a color selection scanning device which is easily affected by heat, the radiation efficiency of the color selection scanning device can be improved by setting the magnification of the imaging lens to less than 1 and increasing the size of a virtual image of the video displaying device on the surface of the color selection scanning device, thus suppressing an increase in temperature.

On the contrary, when the magnification of the imaging lens is increased and the size of a virtual image of the video displaying device on the surface of the color selection scanning device is reduced, the color selection scanning device which is small in size can be used, resulting in realization of miniaturization of the apparatus and reduction in the manufacturing cost.

Moreover, color mixture is not generated in the border area even if the light blocking portion is provided in the color border area of the color selection scanning device, and the width of the light blocking portion can be greatly reduced as compared with the prior art, further improving the brightness of the projected image.

BRIEF DESCRIPTION OF THE DRAWINGS

FIG. 3 is an explanatory diagram showing the arrangement of an optical system in the video projector according to the FIG. 1 embodiment.

FIG. 6 is a side view showing the structure of an optical system in a video projector according to the third embodiment of the present invention.

FIG. 8 is a side view showing the structure of an optical system in a video projector according to the fourth embodiment of the present invention.

DETAILED DESCRIPTION OF THE PREFERRED EMBODIMENTS (First Embodiment)

Figure 1:
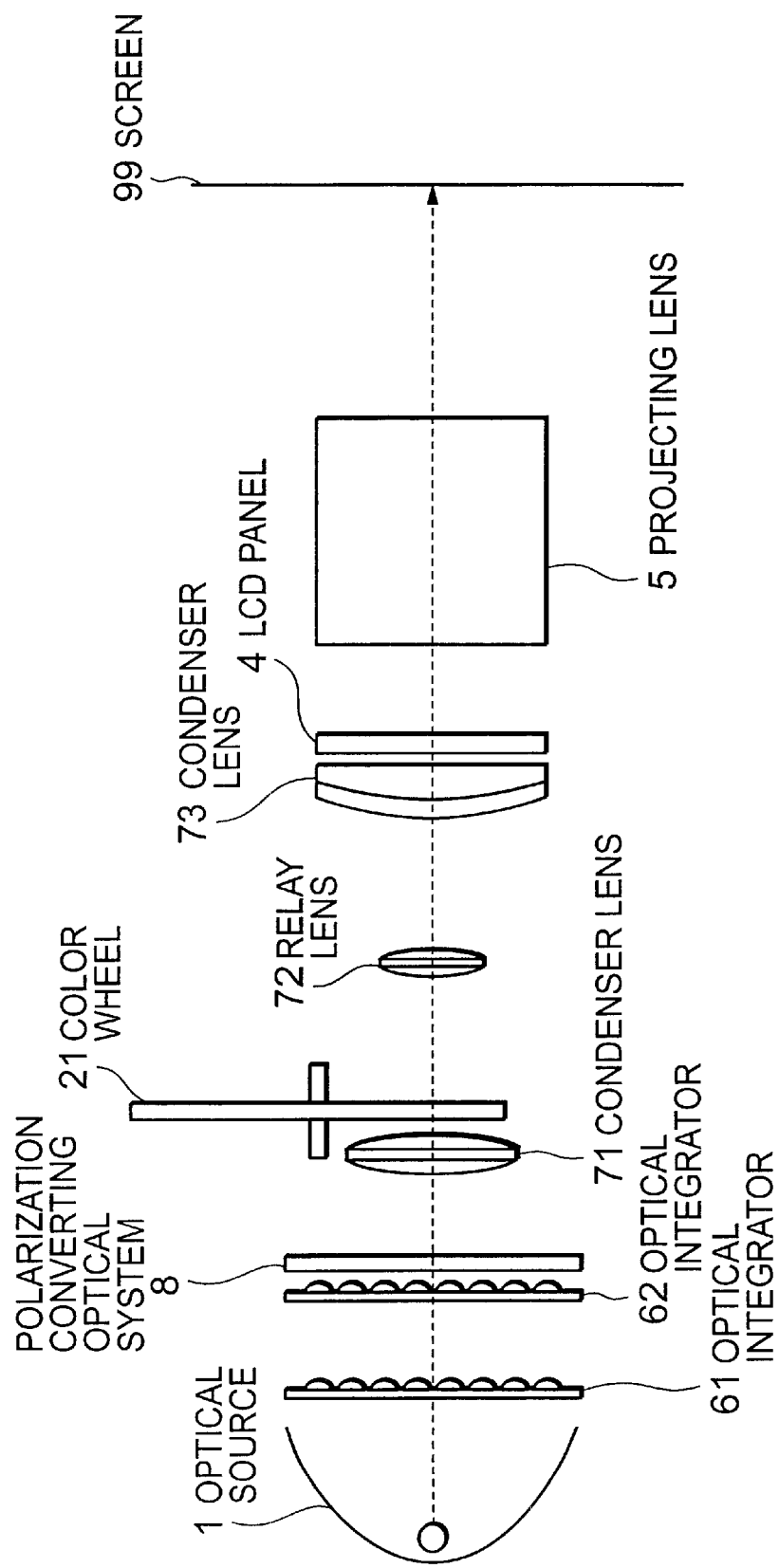
FIG. 1 is a side view showing the structure of an optical system in a video projector according to the first embodiment of the present invention.
Figure 2A:
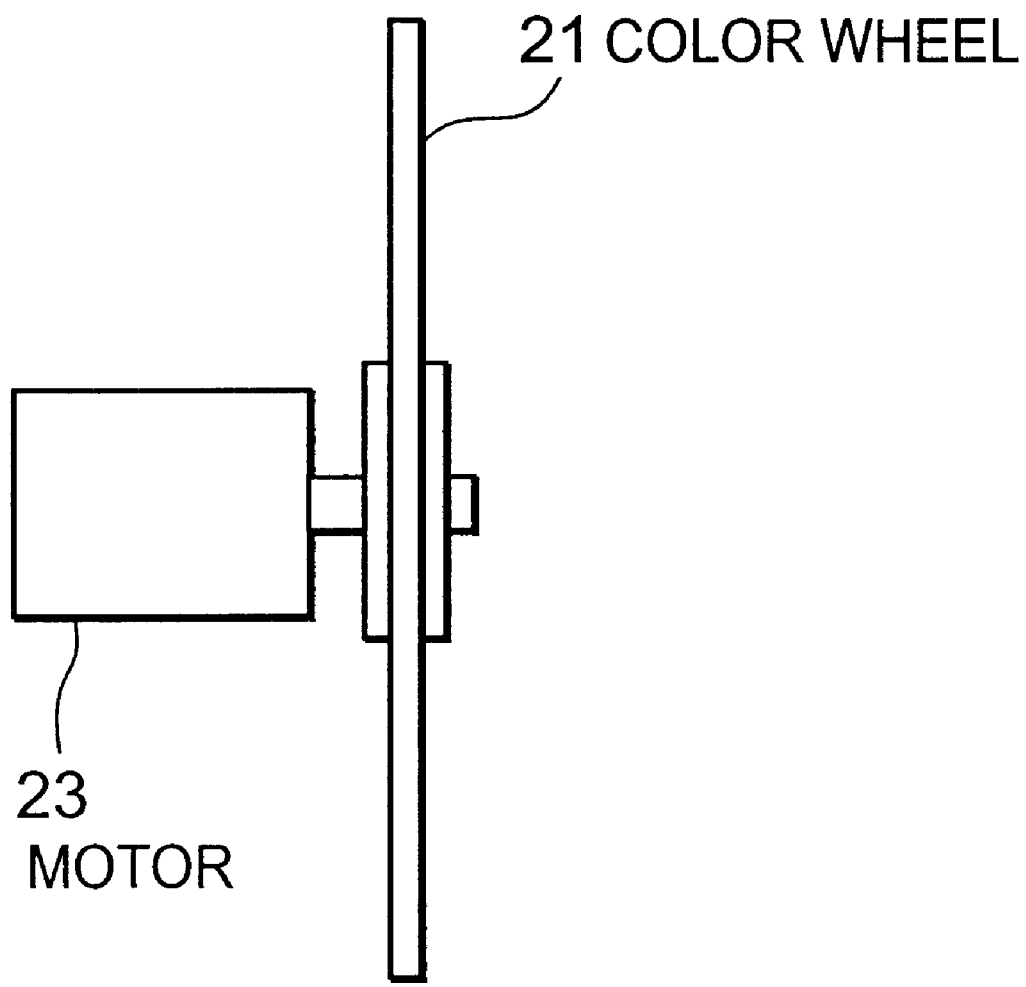
FIG. 2A is a side view of a color wheel 21 in the video projector according to the FIG. 1 embodiment.

FIG. 1 is a side view showing the structure of an optical system in a video projector according to the first embodiment of the present invention. FIG. 2A is a side view of a color wheel 21 in the video projector according to the FIG.

Figure 2B:
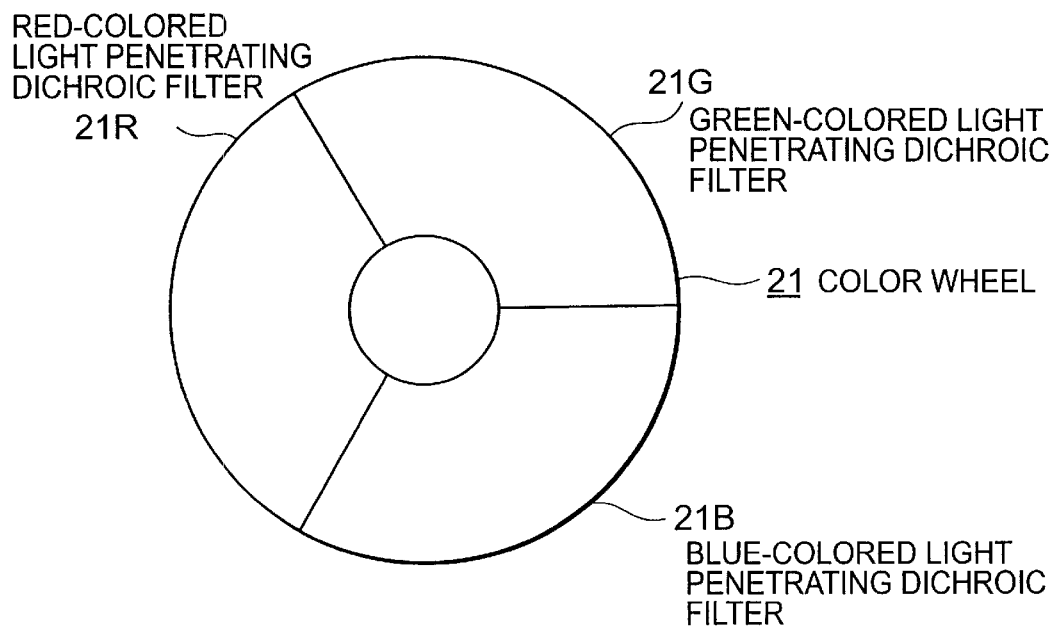
FIG. 2B is a front view of the color wheel 21 in the video projector according to the FIG. 1 embodiment.

1 embodiment. FIG. 2B is a front view of the color wheel 21 in the video projector according to the FIG. 1 embodiment.

In FIG. 1, the video projector according to this embodiment includes an optical source 1; optical integrators 61 and 62; a polarization converting optical system 8; a condenser lens 71; a color wheel 21; a relay lens 72; a condenser lens 73; a liquid crystal display (hereinafter abbreviated to "LCD") panel 4; and a projecting lens 5.

The optical source 1 is composed of a metal halide lamp, a halogen lamp and the like and emits white-colored light.

The optical integrators 61 and 62 are a lens array forming a group of multiple lenses on a flat glass, and the light from the optical source 1 is ideally dispersed into multiple small optical sources by using this lens group to uniformly illuminate the color wheel 21.

The polarization converting optical system 8 is constituted by a combination of a polarized beam splitter and a half-wave plate and aligns polarizing directions of outgoing light fluxes having unequal polarizing directions from the optical integrators 61 and 62 to a fixed direction to be emitted therefrom.

The condenser lens 71 is constituted by combined use of one or more lenses and converges outgoing light fluxes from the polarization converting optical system 8 to efficiently enter into the relay lens 72.

As shown in FIGS. 2A and 2B, the color wheel 21 is an optical device which radializes a red-colored light penetrating dichroic filter 21R, a green-colored light penetrating dichroic filter 21G and a blue-colored light penetrating dichroic filter 21B around the rotating shaft thereof and which connects a motor 23 to this rotating shaft so as to be capable of rotating around the rotational axis. The color wheel 21 is rotated in synchronism with scanning of the LCD panel 4 and sequentially transmits therethrough only each primary-colored light flux in the white-colored light from the optical source 1 in accordance with time division. As a method for manufacturing the color wheel 21, respective fan-shaped end portions of the dichroic filter 21R, 21G and 21B may be directly bonded to each other to be integrally formed, or marginal portions of the respective dichroic filters 21R, 21G and 21B may be fitted in and bonded to a frame body such as a metal plate, a plastic plate and others for holding peripheral portions of the respective dichroic filters 21R, 21G and 21B so as to be integrally formed.

The relay lens 72 consists of combined use of one or more lenses and the like and precisely images an intensity distribution and a color distribution of light flux outgoing from the color wheel 21 on the surface of the LCD panel 4.

The condenser lens 73 consists of combined use of one or more lenses and the like and converges the transmitted light fluxes from the relay lens 72 to be efficiently incident on the projecting lens 5.

The LCD panel 4 is composed of a non-colored dot-matrix LCD device and the like having no color filter. The LCD panel 4 sequentially receives a red-colored light video signal, a green-colored light video signal and a blue-colored light video signal in time-division manner to modulate an intensity of the incoming light for each pixel in accordance with the supplied video signal, namely, control a quantity of penetration of the light to be emitted therefrom.

The projecting lens 5 has a lens structure in which a plurality of lenses are combined and projects the transmitted light from the LCD panel 4 on the screen 99 in a magnified form.

The screen 99 is provided in front of the projecting lens 5, and a projected image is displayed on the screen 99 in a magnified form.

FIG. 3 is an explanatory diagram showing the arrangement of an optical system in the video projector according to the FIG. 1 embodiment.

This embodiment is characterized in that provision of the relay lens 72 between the color wheel 21 and the LCD panel 4 enables the intensity distribution and the color distribution of the light flux outgoing from the color wheel 21 to be precisely imaged on the surface of the LCD panel 4. Blurring or color mixture can not, therefore, occur on the color border of the incident light on the surface of the LCD panel 4, and coincidence of the scanning border of the LCD panel 4 with the color border of the incident light can be maintained. A distance S1 between the color wheel 21 and the relay lens 72, another distance S2 between the relay lens 72 and the LCD panel 4 and a focal distance of the relay lens 72 are selected so as to image the intensity distribution and the color distribution of the light flux outgoing from the color wheel 21 on the surface of the LCD panel 4.

Another characteristic of this embodiment is that the distance S1 between the color wheel 21 and the relay lens 72 and the distance S2 between the relay lens 72 and the LCD panel 4 are set as (S2<S1). Accordingly, a virtual image of the LCD panel 4 on the surface of the color wheel 21 is larger than the size of the LCD panel 4, and hence the compact LCD panel 4 can be used.

(Second Embodiment)

Figure 4:
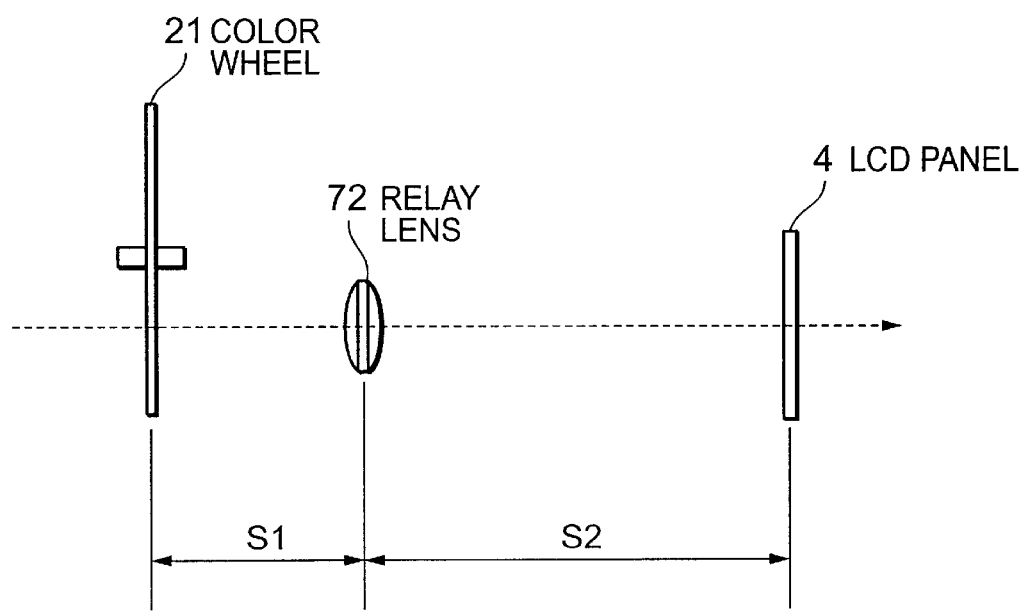
FIG. 4 is an explanatory diagram showing the arrangement of an optical system in a video projector according to the second embodiment of the present invention.

FIG. 4 is an explanatory diagram showing the arrangement of an optical system in a video projector according to the second embodiment of the present invention.

A characteristic of this embodiment lies in that the relay lens 72 is provided and (S2>S1) is set as opposed to FIG. 3. Thus, a virtual image of the LCD panel 4 on the surface of the color wheel 21 is smaller than the size of the LCD panel 4, thereby reducing the size of the color wheel 21 without changing the size of the LCD panel 4.

Here, assuming that (S2/S1)=2 for example, the size of the virtual image of the LCD panel 4 on the color wheel 21 equals to (¼) of the size of the LCD panel 4, and the small color wheel 21 can be used. Further, a light blocking portion 21X (FIG. 5) is provided in the border area of the respective dichroic filters 21R, 21G and 21B of the color wheel 21 in order to prevent adjacent colors from being mixed.

Figure 5:
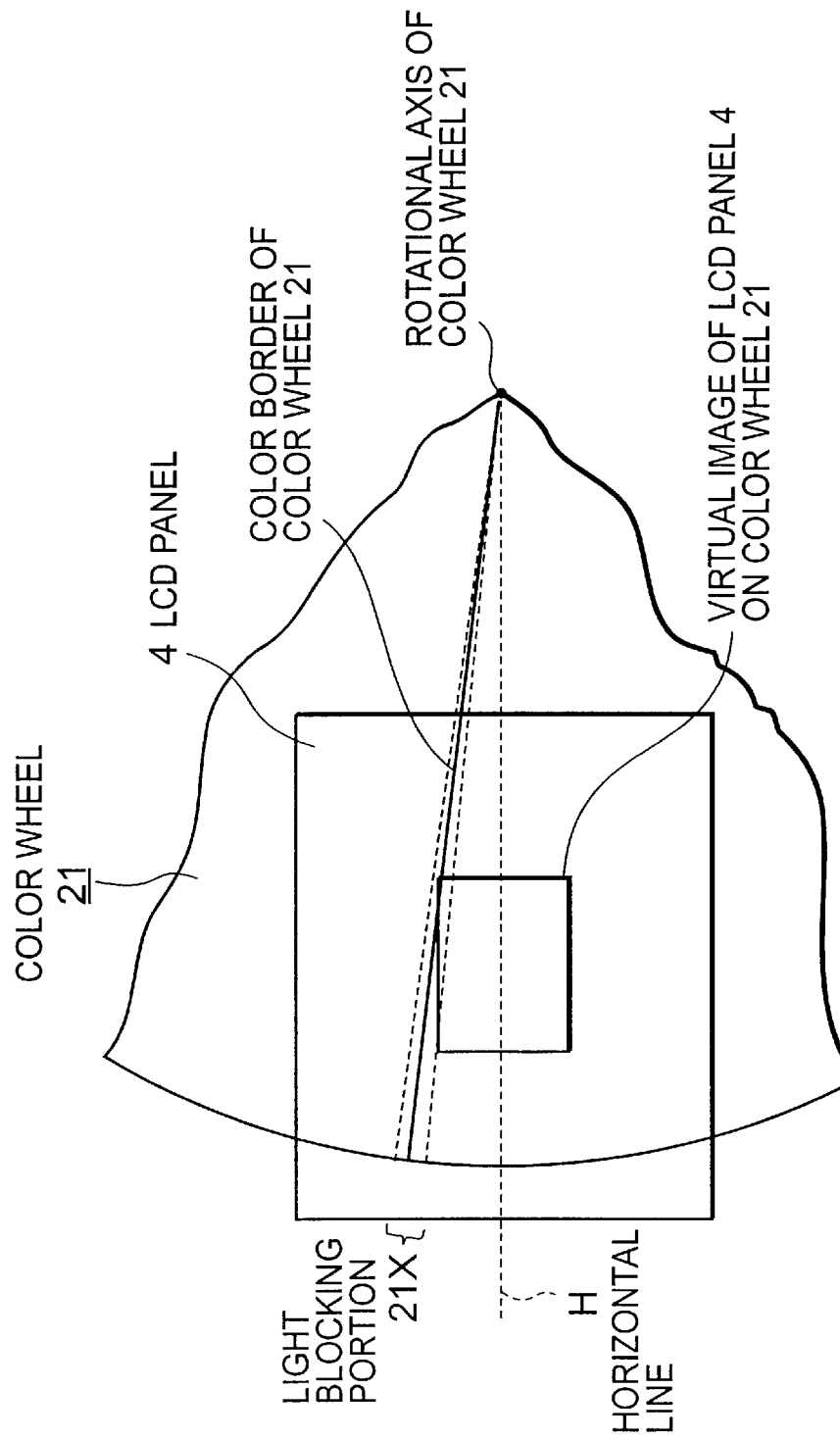
FIG. 5 is an explanatory diagram showing the concept of generation of a virtual image of an LCD panel 4 on the surface of a color wheel 21 in the video projector according to the FIG. 4 embodiment.

FIG. 5 is an explanatory diagram showing the concept of generation of a virtual image of the LCD panel 4 on the surface of the color wheel 21 in the video projector according to the FIG. 4 embodiment.

Since reduction in size of the virtual image of the LCD panel 4 is equivalent to increase in size of the color wheel 21, inclination of the border line of the respective dichroic filters 21R, 21G and 21B of the color wheel 21 becomes small and gets close to the horizontal line H and the superficial content of the area in which different colors are mixed can be thus further reduced, as similar to the case where the diameter of the color wheel 21 is increased. In addition, as shown in FIG. 5, provision of the light blocking portion 21X in the border area of the respective dichroic filters 21R, 21G and 21B of the color wheel 21 can completely prevent different colors from being mixed. In such a case, since blurring is not generated on the surface of the LCD panel 4, an angle of the light blocking portion 21X can be greatly reduced as compared with the prior art.

When applying a black coating compound which does not transmit the light therethrough in the border area of the respective dichroic filters 21R, 21G and 21B of the color wheel 21 or when using a metal plate or a plastic plate as a supporting frame body for the respective dichroic filters 21R, 21G and 21B, the light blocking portion 21X can be formed by a method such as provision of this supporting frame body extending to the border area of the respective dichroic filters 21R, 21G and 21B.

(Third Embodiment)

FIG. 6 is a side view showing the structure of an optical system in a video projector according to the third embodiment of the present invention.

In this embodiment, an electronic color filter 22 is used in place of the color wheel 21 in the first embodiment. The electronic color filter 22 is constituted by combined use of a color polarizing plate, a dot-matrix LCD device and a polarizing plate, and serves as an optical device which controls transmission/non-transmission of pixels with respect to each primary color in synchronism with the supplied video signal and is capable of changing colors of the transmitted light fluxes.

Figure 7A:
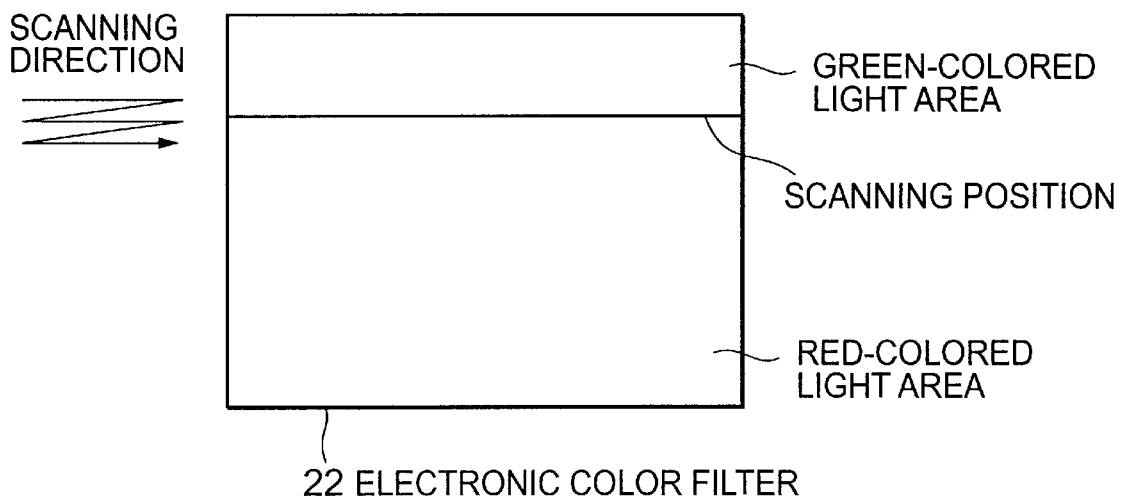
FIG. 7A is an explanatory diagram showing the concept of scanning of an electronic color filter 22 in the video projector according to the FIG. 6 embodiment.
Figure 7B:
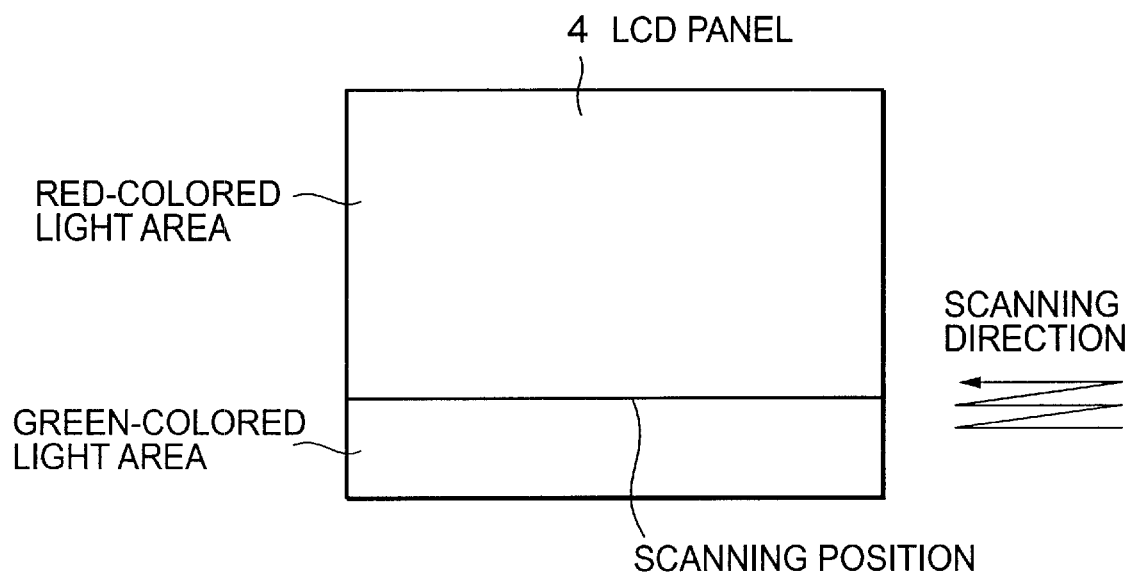
FIG. 7B is an explanatory diagram showing the concept of scanning of the LCD panel 4 in the video projector according to the FIG. 6 embodiment.

FIG. 7A is an explanatory diagram showing the concept of scanning of the electronic color filter 22 in the video projector according to the FIG. 6 embodiment. FIG. 7B is an explanatory diagram showing the concept of scanning of the LCD panel 4 in the video projector according to the FIG. 6 embodiment.

The electronic color filter 22 is sequentially scanned downwards every one line in the horizontal direction and changes colors of the transmitted light fluxes in synchronism with that the LCD panel 4 is sequentially scanned upwards every one line in the horizontal direction. The direction of the scanning is opposed to that of the LCD panel 4 because the image is turned over due to transmission through the relay lens 72. The intensity distribution and the color distribution of the light flux outgoing from the electronic color filter 22 are imaged on the surface of the LCD panel 4 through the relay lens 72 as similar to the first embodiment.

Since the electronic color filter 22 is made up of a liquid crystal device and the like and weak against heat, (S2/S1)= (½) is set and the electronic color filter 22 having an area quadruple of that of the LCD panel 4 is used to irradiate the light incident upon the electronic color filter 22 on the wide area thereof in order to prevent heat in the light from the optical source 1 from being concentrated on a given portion of the electronic color filter 22, thereby suppressing increase in temperature of the electronic color filter 22.

(Fourth Embodiment)

FIG. 8 is a side view showing the structure of an optical system in a video projector according to the fourth embodiment of the present invention.

In FIG. 8, the video projector according to this embodiment includes: an optical source 1; optical integrators 61 and 62; a polarization converting optical system 8; a condenser lens 71; a color wheel 21; a red-colored light penetrating dichroic mirror 91; relay lenses 72R and 72C; reflecting mirrors 93 and 94; condenser lenses 73R and 73C; LCD panels 4R and 4C; a cyan-colored light penetrating dichroic mirror 92; and a projecting lens 5. Only a difference from the embodiment shown in FIG. 1 will be described herein.

In FIG. 8, the outgoing light from the color wheel 21 is divided into a rightward red-colored light flux in FIG. 8, a downward green-colored light flux in FIG. 8 and a downward blue-colored light flux in FIG. 8 by the red-colored light penetrating dichroic mirror 91 which transmits the red-colored light flux therethrough but reflects the cyan-colored light flux thereon.

The relay lens 72R precisely images the intensity distribution on the surface of the LCD panel 4 with respect to only the red-colored light component having penetrated the red-colored light penetrating dichroic mirror 91 out of the light flux outgoing from the color wheel 21.

The reflecting mirror 93 reflects thereon the transmitted light from the relay lens 72R.

The condenser lens 73R consists of one or more lenses or the like and causes the reflected light from the reflecting mirror 93 to converge so as to be efficiently incident on the projecting lens 5.

The LCD panel 4R is composed of a non-colored dot-matrix LCD device and the like having no color filter and subjects the incident light to the intensity modulation for each pixel in accordance with a supplied red-colored video signal so that the incident light outgoes therefrom.

Further, the relay lens 72C precisely images the intensity distribution and the color distribution on the surface of the LCD panel 4C with respect to the green-colored light flux and the blue-colored light flux reflected on the red-colored light penetrating dichroic mirror 91 out of the light flux outgoing from the color wheel 21.

The reflecting mirror 94 reflects thereon the light flux having penetrated through the relay lens 72C.

The condenser lens 73C consists of one or more lenses and causes the reflected light flux from the reflecting mirror 94 to converge so as to be efficiently incident on the projecting lens 5.

The LCD panel 4C is composed of a non-colored dot-matrix LCD device and the like having no color filter. The LCD panel 4C sequentially receives a green-colored light video signal and a blue-colored light video signal in time-division manner and carries out the intensity modulation with respect to the incident light for each pixel in accordance with the supplied video signal so that the incident light outgoes therefrom.

The cyan-colored light penetrating dichroic mirror 92 is an optical device which reflects the red-colored light flux thereon and transmits the cyan-colored light flux therethrough, and it combines the transmitted light fluxes from the LCD panels 4R and 4C.

Figure 9A:
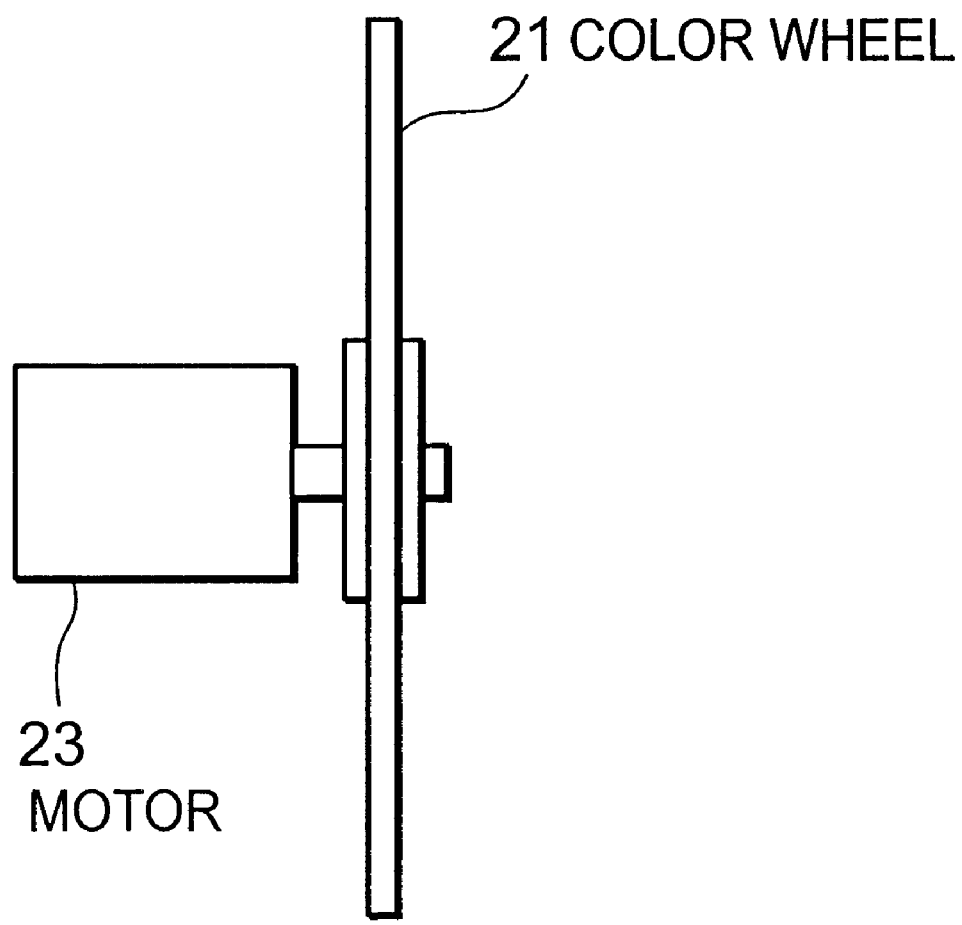
FIG. 9A is a side view of a color wheel 21 in the video projector according to the FIG. 8 embodiment.
Figure 9B:
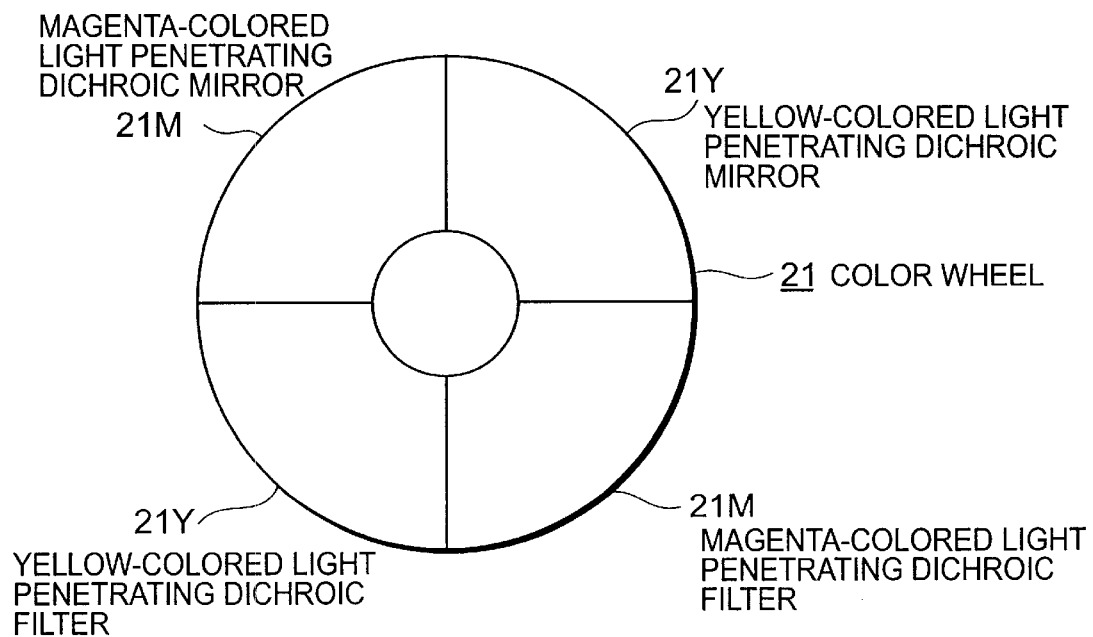
FIG. 9B is a front view of the color wheel 21 in the video projector according to the FIG. 8 embodiment.

FIG. 9A is a side view of the color wheel 21 in the video projector according to the FIG. 8 embodiment. FIG. 9B is a front view of the color wheel 21 in the video projector according to the FIG. 8 embodiment.

In the color wheel 21, a yellow-colored light penetrating dichroic filter 21Y and a magenta-colored light penetrating dichroic filter 21M are alternately provided at right angle in a radial pattern around the rotating shaft, and a motor 23 is connected to the rotating shaft so that the wheel can rotate around the rotating shaft.

While the transmitted light flux from the condenser lens 71 is being incident on the yellow-colored light penetrating dichroic filter 21Y, the red-colored light penetrating dichroic mirror 91 transmits the red-colored light flux therethrough and reflects the blue-colored light flux thereon. The LCD panels 4R and 4C receive the red-colored light flux and the blue-colored light flux, respectively.

The red-colored light video signal is supplied to the LCD panel 4R, and the green-colored light video signal and the blue-colored light video signal are alternately fed to the LCD panel 4C.

As described above, the invention can be realized by using a plurality of LCD panels in this embodiment.

(Fifth Embodiment)

Figure 10:
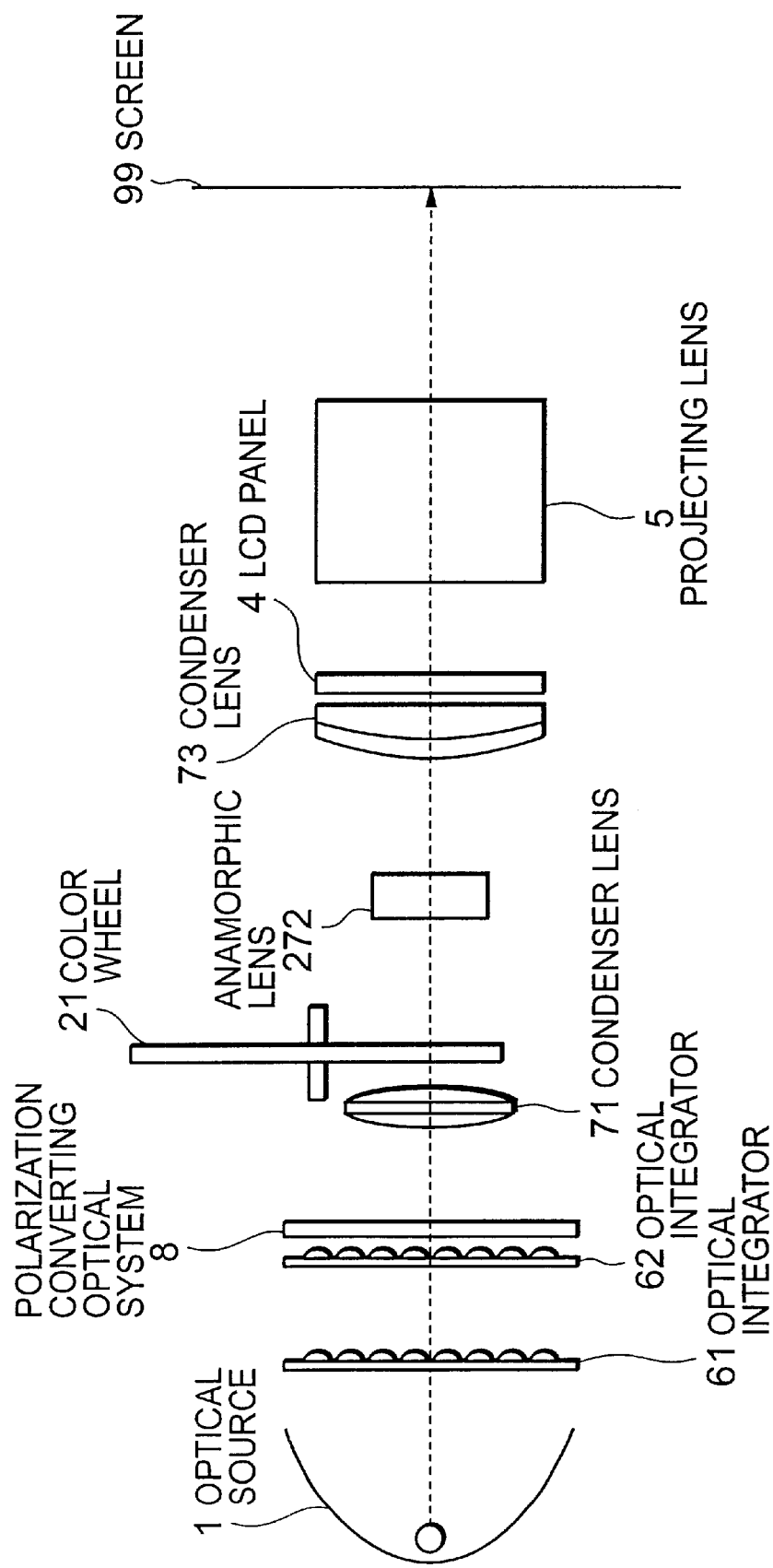
FIG. 10 is a side view showing the structure of an optical system in a video projector according to the fifth embodiment of the present invention.

FIG. 10 is a side view showing the structure of an optical system in a video projector according to the fifth embodiment of the present invention.

The video projector of this embodiment substitutes an anamorphic lens 272 for the relay lens 72 in the video projector according to the first embodiment of the present invention shown in FIG. 1, and any other structure is the same with that shown in FIG. 1.

The anamorphic lens 272 is constituted by arranging two achromatic prisms (prism obtained by laminating glasses having different refraction factors) before a composite lens and has such a characteristic as that the magnification of an image differs in the horizontal direction and the vertical direction on an image field or the focal distance of the same differs in the horizontal direction and the vertical direction.

Therefore, the outgoing light from the anamorphic lens 272 has such a property as that an enlargement ratio in a given direction is different from that in a direction orthogonal to this given direction on a flat surface vertical to the optical axis.

In other words, when the direction of the anamorphic lens 272 in which the enlargement ratio is high is set along the horizontal direction, the outgoing light is magnified in the horizontal direction relative to the incoming light. On the contrary, when the direction of the anamorphic lens 272 in which the enlargement ratio is high is set along the vertical direction, the outgoing light is magnified in the vertical direction.

Figure 11A:
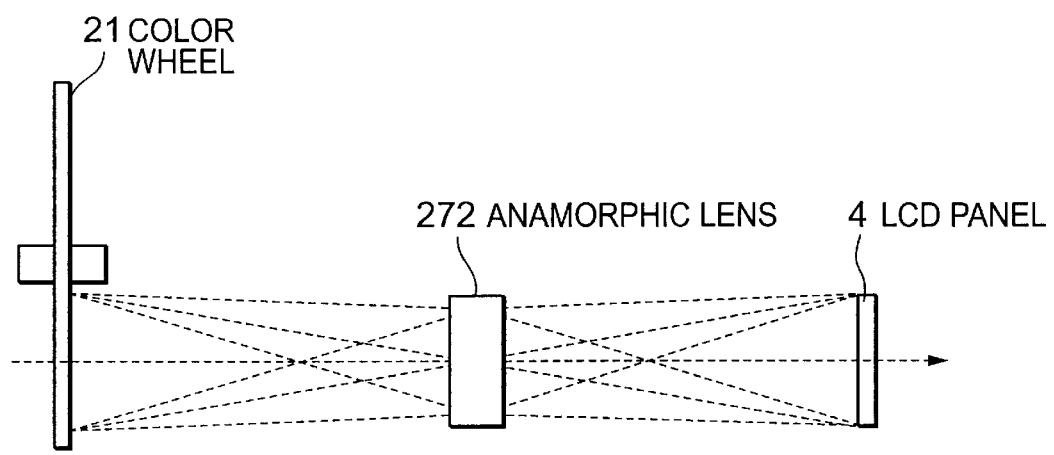
FIG. 11A is a plan view showing the arrangement of an optical system in the video projector according to the FIG. 10 embodiment.
Figure 11B:
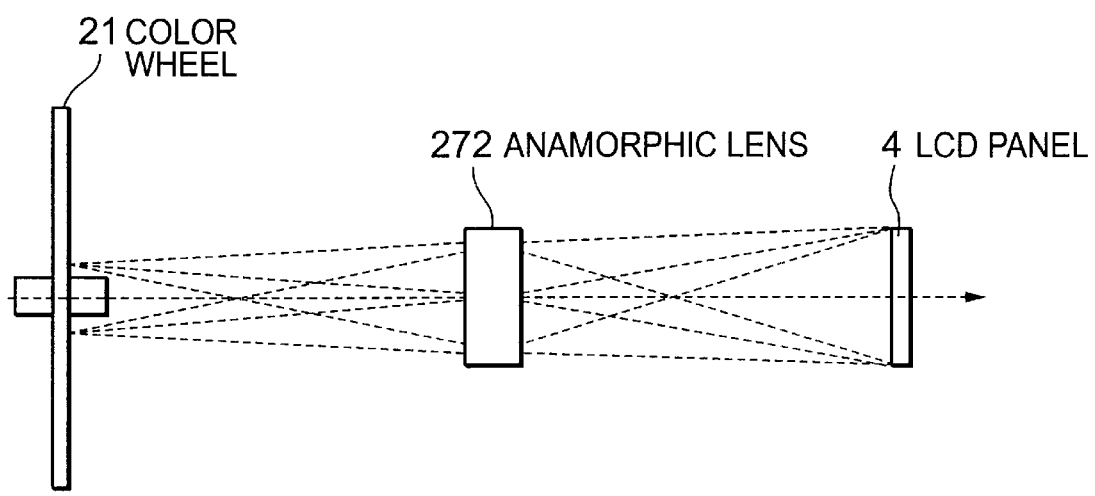
FIG. 11B is a side view showing the arrangement of the optical system in the video projector according to the FIG. 10 embodiment.

FIG. 11A is a plan view showing the arrangement of the optical system in the video projector according to the FIG. 10 embodiment. FIG. 11B is a side view showing the arrangement of the optical system in the video projector according to the FIG. 10 embodiment.

A characteristic of this embodiment lies in that interposition of the anamorphic lens 272 between the color wheel 21 and the LCD panel 4 enables precise imaging of the transmitted light from the color wheel 21 on the surface of the LCD panel 4. Accordingly, blurring or color mixture does not occur on the color border of the incident light on the surface of the LCD panel 4 and coincidence of the scanning border of the LCD panel 4 with the color border of the incident light is maintained as similar to the first embodiment.

Further, another characteristic of this embodiment lies in that the anamorphic lens 272 is used to magnify the outgoing light from the color wheel 21 only in the vertical direction.

Figure 12:
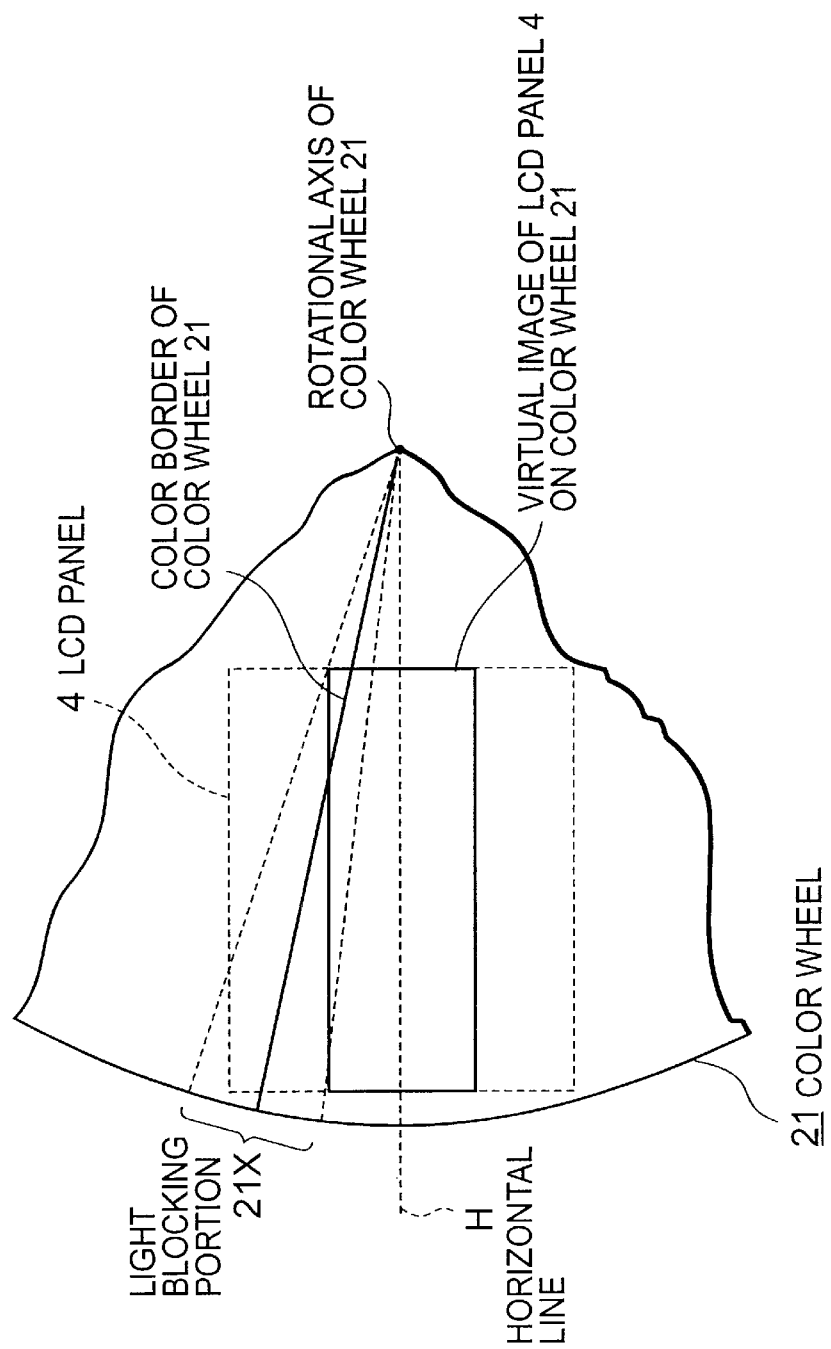
FIG. 12 is an explanatory diagram showing the concept of generation of a virtual image of the LCD panel 4 on the surface of the color wheel 21 in the video projector according to the FIGS. 11A and 11B embodiments.

FIG. 12 is an explanatory diagram showing the concept of generation of a virtual image of the LCD panel 4 on the surface of the color wheel 21 in the video projector according to the FIGS. 11A and 11B embodiments.

In FIG. 12, the size of a virtual image of the LCD panel 4 on the surface of the color wheel 21 is smaller than the actual size of the LCD panel 4 in the vertical direction.

Therefore, since the virtual image of the LCD panel 4 is demagnified on the color wheel 21 in the vertical direction, the angle between the virtual image and the color border on the color wheel 21 becomes smaller, thereby further reducing the size of the light blocking portion 21X.

(Sixth Embodiment)

Figure 13A:
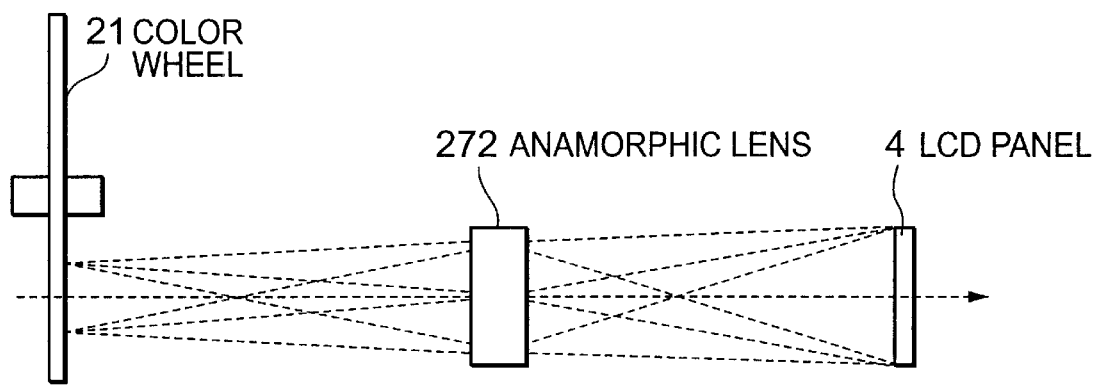
FIG. 13A is a plan view showing the arrangement of an optical system in a video projector according to the sixth embodiment of the present invention.
Figure 13B:
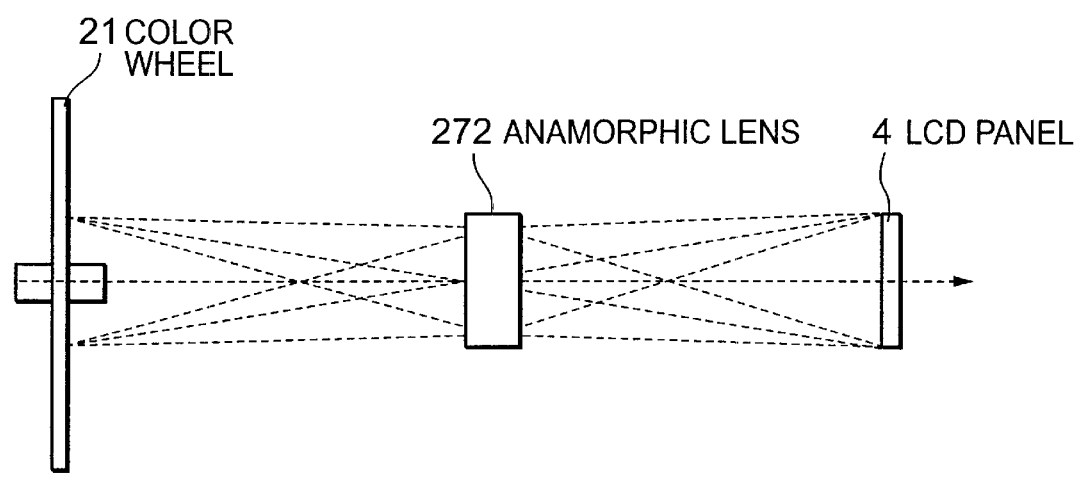
FIG. 13B is a side view showing the arrangement of the optical system in the video projector according to the FIG. 13A embodiment.

FIG. 13A is a plan view showing the arrangement of an optical system in a video projector according to the sixth embodiment of the present invention. FIG. 13B is a side view showing the arrangement of the optical system in the video projector according to the FIG. 13A embodiment.

In this embodiment, the direction of the anamorphic lens 272 in which the enlargement ratio is high in the fifth embodiment is rotated 90 degrees around the optical axis.

A characteristic of this embodiment lies in that the transmitted light from the color wheel 21 is precisely imaged on the surface of the LCD panel 4 by providing the anamorphic lens 272 between the color wheel 21 and the LCD panel 4. As similar to the first embodiment, blurring or color mixture is not thus generated on the color border of the incident light on the surface of the LCD panel 4 and the coincidence of the scanning border of the liquid crystal display panel 4 with the color border of the incident light is maintained.

Another characteristic of this embodiment lies in that the outgoing light from the color wheel 21 is enlarged only in the horizontal direction by the anamorphic lens 272.

Figure 14:
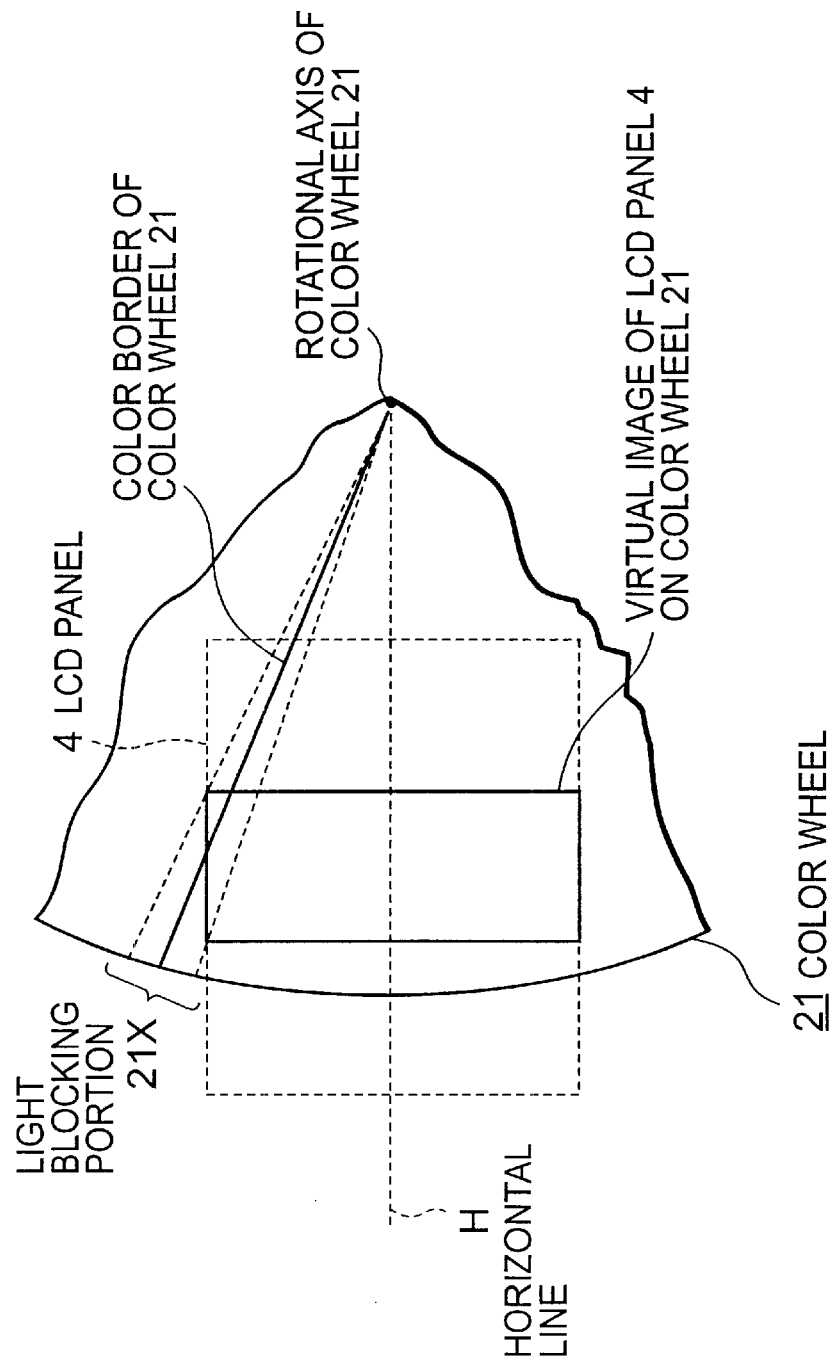
FIG. 14 is an explanatory diagram showing the concept of generation of a virtual image of the LCD panel 4 on the surface of the color wheel 21 in the video projector according to the FIGS. 13A and 13B embodiments.

FIG. 14 is an explanatory diagram showing the concept of generation of a virtual image of the LCD panel 4 on the surface of the color wheel 21 in the video projector according to the FIGS. 13A and 13B embodiments.

In FIG. 14, the size of the virtual image of the LCD panel 4 on the surface of the color wheel 21 is smaller than the actual size of the LCD panel 4.

Accordingly, the size of the color wheel 21 can be reduced without changing the size of the LCD panel 4.

In addition, since a virtual image of the LCD panel 4 on the color wheel 21 can be decreased, the inclination of the virtual image relative to the color border of the color wheel 21 can become smaller, thereby further reducing the size of the light blocking portion 21X.

(Seventh Embodiment)

Figure 15:
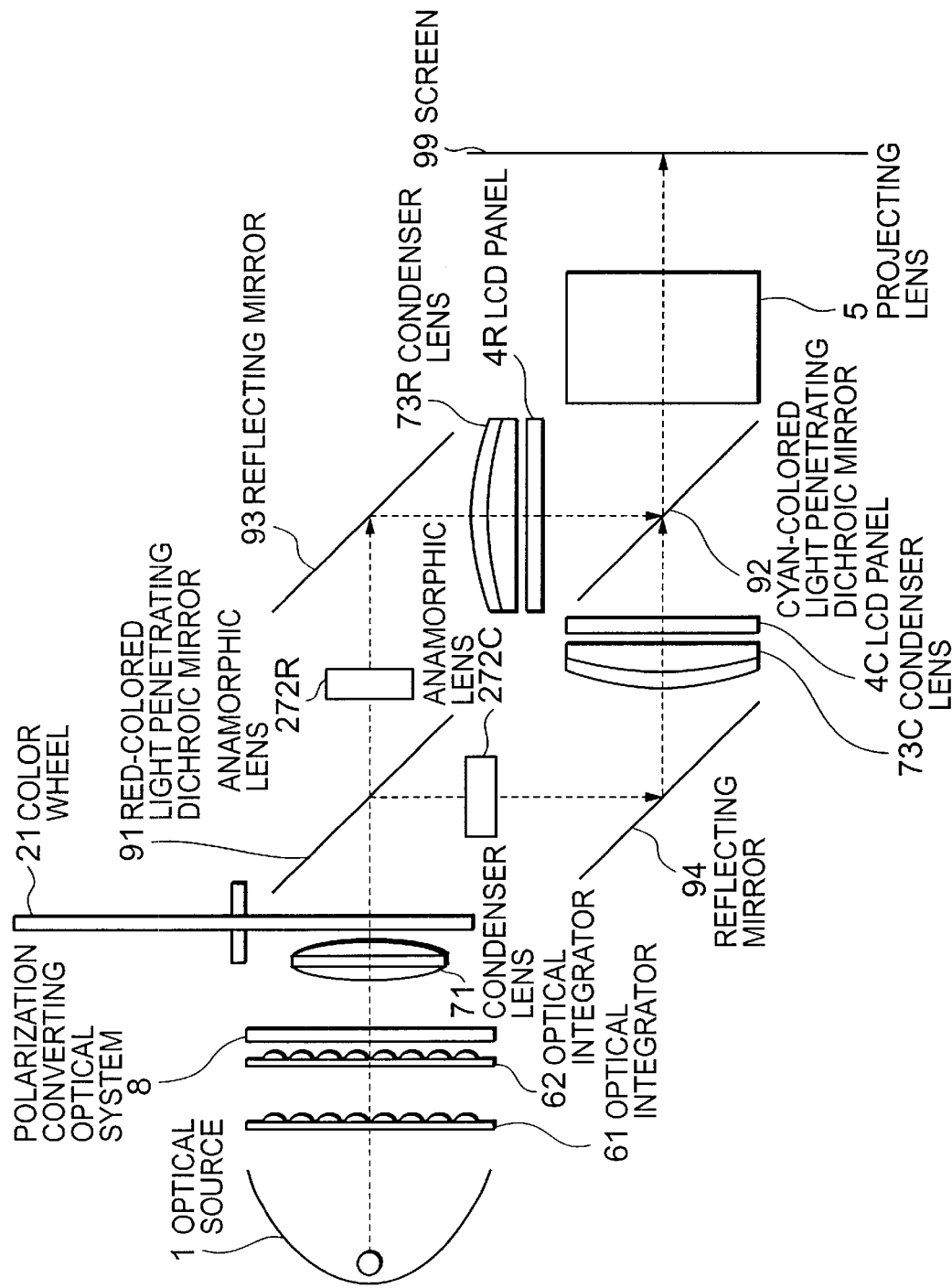
FIG. 15 is a side view showing the structure of a video projector according to the seventh embodiment of the present invention.
Figure 16:
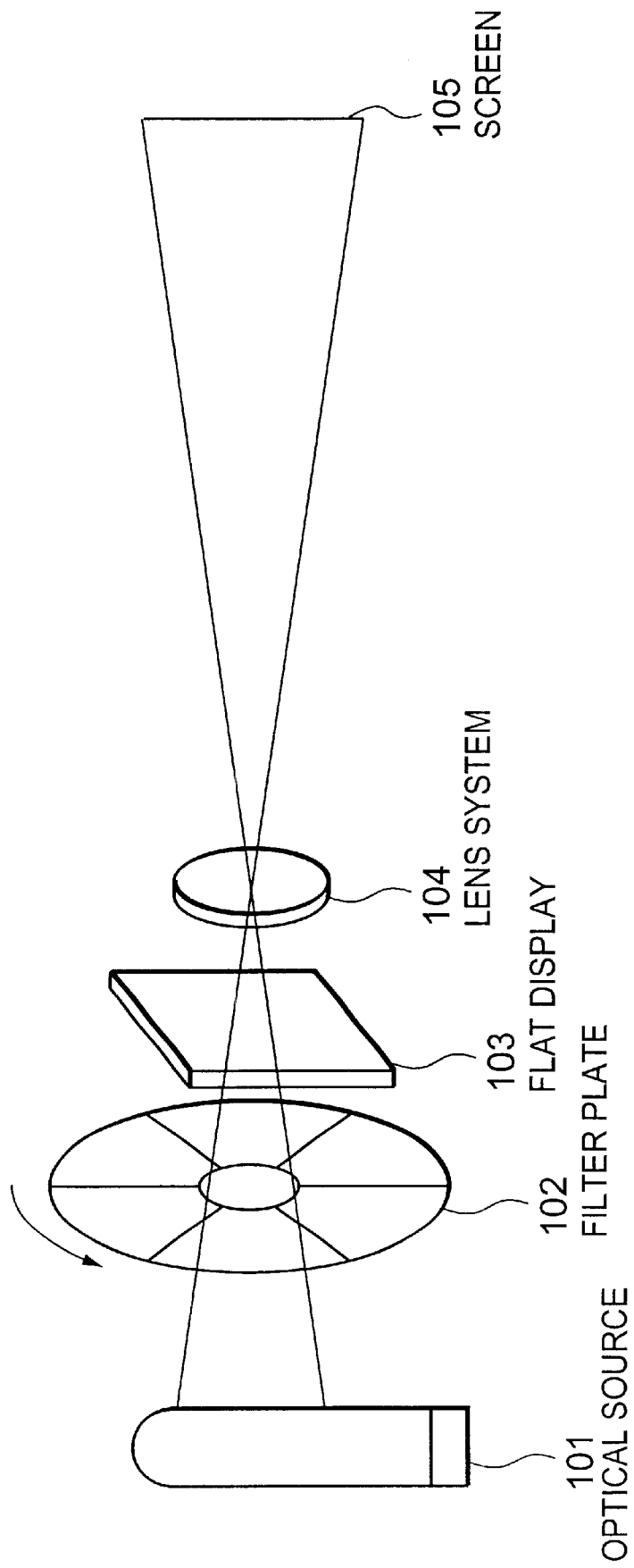
FIG. 16 is a perspective view showing the structure of a conventional video projector.
Figure 17:
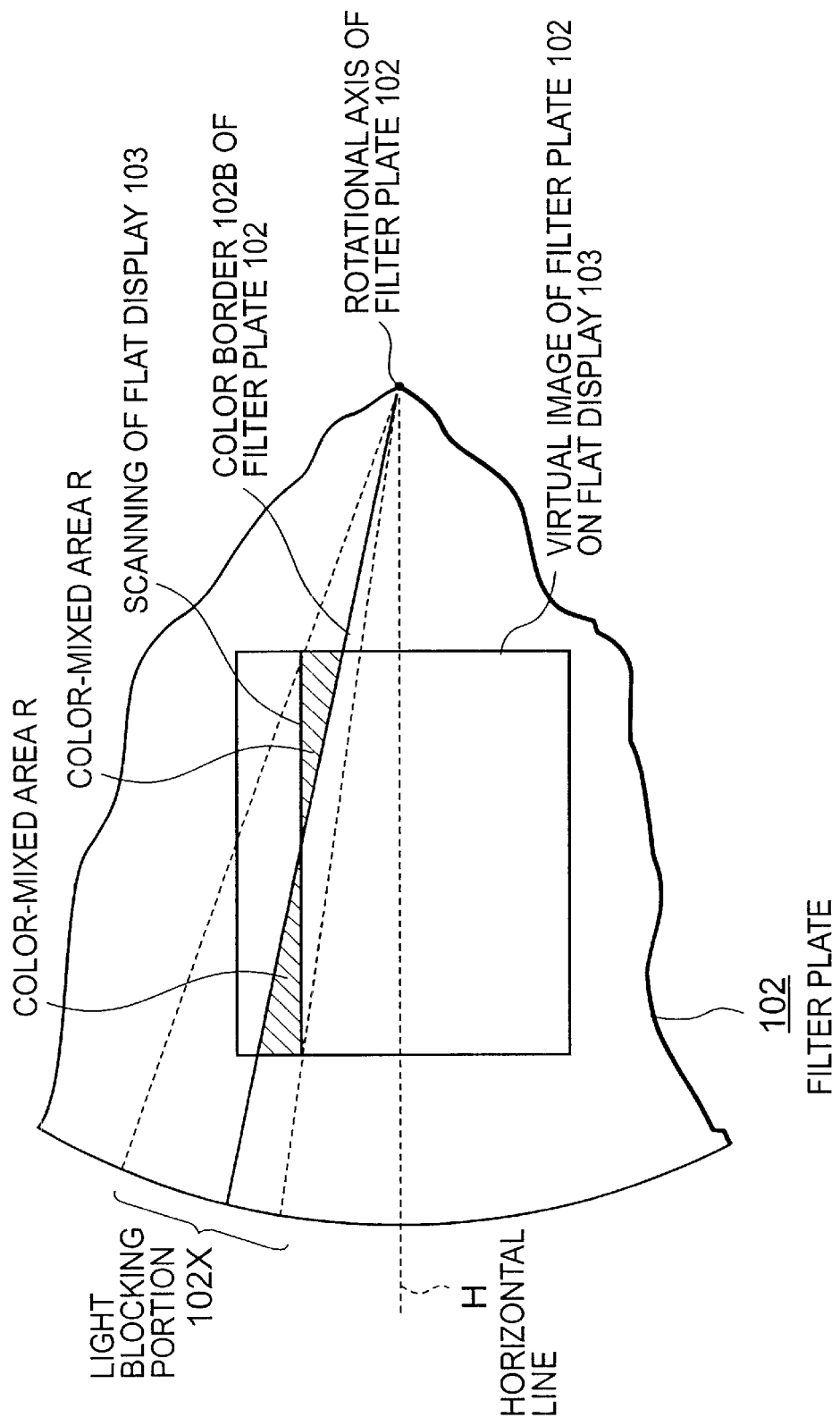
FIG. 17 is a partially-enlarged front view showing the filter plate 102 in the video projector illustrated in FIG. 16.

FIG. 15 is a side view showing the structure of a video projector according to the seventh embodiment of the present invention.

The video projector of this embodiment substitutes anamorphic lenses 272R and 272C for the relay lenses 72R and 72C according to the fourth embodiment of the present invention. Description will be given only as to a difference from FIG. 8 herein.

The both anamorphic lenses 272R and 272C are provided in such a manner that their directions in which the enlargement ratio is high are matched with each other, and the respective outgoing light fluxes from the anamorphic lenses 272R and 272C are magnified or demagnified in the horizontal or vertical direction and precisely imaged on the respective LCD panels 4R and 4C. The outgoing light fluxes from the respective LCD panels 4R and 4C are combined by the cyan-colored light penetrating dichroic mirror 92 to be projected on the screen 99.

Therefore, this embodiment can have the characteristics of the foregoing fourth to sixth embodiments and can be realized by using a plurality of LCD panels, and the size of the color wheel 21 can be reduced without changing the size of the LCD panel 4.

In each of the above embodiments, although the flat-shaped optical integrators 61 and 62 are used, this type of optical integrator may be replaced by a rod integrator or a rod lens which is made of square-pole-shaped glass and obtains an outgoing light flux having a uniform intensity by internally reflecting an incident light flux for multiple times.

Additionally, although the LCD panel 4, 4R, 4C and the electronic color filter 22 are used for modulating an intensity of a light flux pixel by pixel to form a modulated image responsive to the video signal in each of the above-described embodiments, it may be substituted by any optical device which is sequentially scanned in accordance with the video signal and modulates the intensity of an incident light flux to outgo therefrom.

Further, the green-colored light flux and the blue-colored light flux are both used by one LCD panel 4C in the fourth and seventh embodiments, but other arbitrary two colors may be used for one LCD panel, or an independent LCD panel may be used for each primary color. Also, a number of color partitions of the color wheel 21 is arbitrary.

Although the color wheel 21 or the electronic color filter 22 is of a penetrating type for filtering a light by penetrating a light flux having a required color in each of the above embodiments, a color wheel or an electronic color filter which is of a reflecting type for filtering by reflecting a light flux having a required color may be used. In this case, it is enough if only the color wheel 21 or the electronic color filter 22 is constituted so as to have a reflecting characteristic with respect to each color. For example, it may be formed by depositing a multi-layered film having the reflecting characteristic on the surface thereof.

Further, in the third embodiment, although a dot-matrix LCD device is used as the electronic color filter 22, an LCD device having a striped pixel structure in the horizontal direction may be used.

Furthermore, in the third embodiment, the combined use of the color polarizing plate, the dot-matrix LCD device and the polarizing plate is employed as the electronic color filter 22, but the electronic color filter 22 may be any device which can obtain a light flux having a given color while electrically scanning.

Moreover, in each of the above embodiments, although the colored light fluxes transmitting through the color wheel 21 or the electronic color filter 22 are three, i.e., a red-colored light flux, a green-colored light flux and a blue-colored light flux, four or more colored light fluxes may be used. Also, a white-colored light flux may be used as a colored light flux to be selected.

In addition, a number of partitions of the color wheel 21 in each of the above embodiments may be arbitrary.

Adoption of the above-described structure leads to the following advantages of the video projector according to the present invention.

Firstly, the high color purity of a projected image and the high fidelity of a screen image can be advantageously obtained. That is because provision of the imaging lens causes the color border formed by the color selection scanning device to be precisely imaged on the surface of the video displaying device, generating no blurring or color mixture.

Secondly, when setting a distance between the color selection scanning device and the imaging lens to be larger than that between the imaging lens and the video displaying device, it is advantageous that the increase in temperature of the color selection scanning device can be suppressed and the video projector which is suited for the continuous use and has the high durability can be realized. That is because the size of the color selection scanning device can be increased irrespective of the size of the video displaying device and discharge of the heat from the illuminating light is facilitated while the increase in temperature can be reduced. The cooling efficiency at the time of forcible cooling can be also enhanced.

Thirdly, setting the distance between the color selection scanning device and the imaging lens to be smaller than that between the imaging lens and the video displaying device results in an advantage of realization of a compact apparatus and reduction in the manufacturing cost. That is because, the size of the color selection scanning device can be reduced irrespective of the size of the video displaying device.

Fourthly, when using a color wheel as the color selection scanning device and setting the distance between the color selection scanning device and the imaging lens to be smaller than that between the imaging lens and the video displaying device, the color shading of a projected image can be advantageously suppressed while improving the brightness of the projected image. That is because the size of the color wheel is relatively large with respect to a virtual image of the video displaying device, and the border line between the respective colors of the color wheel approximates the horizontal line to reduce a size of an area in which color mixture occurs. Further, even if the light blocking portion is provided in the border areas of the respective colors of the color wheel, a superficial content of the light blocking portion can be greatly reduced as compared with the prior art.

Fifthly, employment of an anamorphic lens as the imaging lens advantageously leads to realization of a compact structure of the apparatus and reduction in the manufacturing cost. That is because the size of the color selection scanning device is relatively large with respect to a virtual image of the video displaying device, and the border line between the respective colors of the color selection scanning device thus approximates the horizontal line to reduce a size of an area in which color mixture occurs. In addition, even if the light blocking portion is provided in the border area of the respective colors of the color selection scanning device, a superficial content of the light blocking portion can be greatly reduced as compared with the prior art.

What is claimed is:

1. A video projector comprising:

an optical source;

a color selection scanning device for selectively filtering a color of a light from said optical source to generate a light flux having a specific color in synchronism with a supplied video signal;

a video displaying device for modulating an intensity of said light flux in synchronism with said video signal pixel by pixel to form a modulated image responsive to said video signal;

an imaging lens disposed between said color selection scanning device and said video displaying device, for imaging an intensity distribution and a color distribution of said light flux outgoing from said color selection scanning device on a surface of said video displaying device;

a condenser lens disposed intermediate said imaging lens and said video displaying device; and a projecting lens for projecting said modulated image formed by said video displaying device.

2. The video projector as defined in claim 1, wherein said video displaying device is a dot-matrix liquid crystal display device.

3. The video projector as defined in claim 1, wherein said color selection scanning device is constituted by sequentially radializing optical filters colored so as to transmit said light flux having said specific color therethrough around a rotary axis thereof and is rotated in synchronism with said video signal.

4. The video projector as defined in claim 3, wherein said color selection scanning device has a light blocking portion for blocking off an incident light provided on a border portion of said optical filters colored so as to transmit therethrough said light flux having said specific color therethrough.

5. The video projector as defined in claim 1, wherein said color selection scanning device is constituted by sequentially radializing optical filters to which a multi-layered film is deposited so as to reflect said light flux having said specific color thereon around a rotary axis thereof and is rotated in synchronism with said video signal.

6. The video projector as defined in claim 5, wherein said color selection scanning device has a light blocking portion for blocking off an incident light provided on a border portion of said optical filters to which a multi-layered film is deposited so as to reflect said light flux having said specific color thereon.

7. The video projector as defined in claim 1, wherein said color selection scanning device is an electronic color filter composed of a pixel group constituted so as to transmit therethrough or reflect thereon said light flux having said specific color, in synchronism with said video signal.

8. The video projector as defined in claim 1, further comprising a polarization converting optical system disposed between said optical source and said color selection scanning device, for aligning polarization directions of said light from said optical source to a predetermined direction.

9. The video projector as defined in claim 1, further comprising an optical integrator disposed between said optical source and said color selection scanning device, for uniformly dispersing said light from said optical source.

10. The video projector as defined in claim 1, wherein said imaging lens is an anamorphic lens, and a convex side of said condenser lens faces said imaging lens.

11. A video projector comprising:
an optical source;
a color selection scanning device for selectively filtering a color a light from said optical source to generate a specific color in synchronism with a supplied video signal;
a color separating device for separating a light flux transmitted through or reflected on said color selection scanning device into first and second light fluxes having different wavelengths;
a color combining device for combining said first and second light fluxes separated by said color separating device;
a first video displaying device disposed between said color separating device and said color combining device, for modulating an intensity of said first light flux in synchronism with said video signal pixel by pixel to form a first modulated image responsive to said video signal;
a second video displaying device disposed between said color separating device and said color combining device, for modulating an intensity of said second light flux in synchronism with said video signal pixel by pixel to form a second modulated image responsive to said video signal;
a first imaging lens disposed between said color separating device and said first video displaying device, for imaging an intensity distribution and a color distribution of said light flux outgoing from said color selection scanning device on a surface of said first video displaying device;
a second imaging lens disposed between said color separating device and said second video displaying device, for imaging an intensity distribution and a color distribution of said light flux outgoing from said color selection scanning device on a surface of said second video displaying device;
a first condenser lens disposed intermediate said first imaging lens and said first video displaying device;
a second condenser lens disposed intermediate said second imaging lens and said second video displaying device; and
a projecting lens for projecting said first modulated image and said second modulated image formed by said first video displaying device and said second video displaying device.

12. The video projector as defined in claim 11, wherein said first video displaying device and said second video displaying devices are dot-matrix liquid crystal display devices.

13. The video projector as defined in claim 11, wherein said color selection scanning device is constituted by sequentially radializing optical filters colored so as to transmit said light flux having said specific color therethrough around a rotary axis thereof and is rotated in synchronism with said video signal.

14. The video projector as defined in claim 13, wherein said color selection scanning device has a light blocking portion for blocking off an incident light provided on a border portion of said optical filters colored so as to transmit therethrough said light flux having said specific color.

15. The video projector as defined in claim 11, wherein said color selection scanning device is constituted by sequentially radializing optical filters to which a multi-layered film is deposited so as to reflect said light flux having said specific color thereon around a rotary axis thereof and is rotated in synchronism with said video signal.

16. The video projector as defined in claim 15, wherein said color selection scanning device has a light blocking portion for blocking off an incident light provided on a border portion of said optical filters to which a multi-layered film is deposited so as to reflect said light flux having said specific color thereon.

17. The video projector as defined in claim 11, wherein said color selection scanning device is an electronic color filter composed of a pixel group constituted so as to transmit therethrough or reflect thereon said light flux having said specific color, in synchronism with said video signal.

18. The video projector as defined in claim 11, further comprising a polarization converting optical system disposed between said optical source and said color selection scanning device, for aligning polarization directions of said light from said optical source to a predetermined direction.

19. The video projector as defined in claim 11, further comprising an optical integrator disposed between said optical source and said color selection scanning device, for uniformly dispersing said light from said optical source.

20. The video projector as defined in claim 11, wherein said first imaging lens and said second imaging lens are anamorphic lenses having a convex surface facing said first and second condenser lenses and a convex surface facing said color separating device.

21. A video projector comprising:
an optical source;
a color selection scanning device for selectively filtering a color of a light from said optical source to generate a light flux having a specific color in synchronism with a supplied video signal;
a video displaying device for modulating an intensity of said light flux in synchronism with said video signal pixel by pixel to form a modulated image responsive to said video signal;
an imaging lens disposed between said color selection scanning device and said video displaying device, for imaging an intensity distribution and a color distribution of said light flux outgoing from said color selection scanning device on a surface of said video displaying device;
a condenser lens disposed intermediate said imaging lens and said video displaying device; and
a projecting lens for projecting said modulated image formed by said video displaying device,
wherein said imaging lens has a convex surface facing said video displaying device and a convex surface facing said color selection scanning device.

* * * * *